US012680607B2

(12) United States Patent
Takeda et al.

(10) Patent No.: US 12,680,607 B2
(45) Date of Patent: Jul. 14, 2026

(54) SHIFT DEVICE

(71) Applicant: KABUSHIKI KAISHA TOKAI-RIKA-DENKI-SEISAKUSHO, Aichi-ken (JP)

(72) Inventors: Kakunari Takeda, Aichi (JP); Kazuhiro Saito, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 207 days.

(21) Appl. No.: 18/225,941

(22) Filed: Jul. 25, 2023

(65) Prior Publication Data

US 2024/0035562 A1     Feb. 1, 2024

(30) Foreign Application Priority Data

Jul. 28, 2022     (JP) .................................. 2022-120885

(51) Int. Cl.
*F16H 59/10*          (2006.01)
(52) U.S. Cl.
CPC .................................. *F16H 59/105* (2013.01)
(58) Field of Classification Search
CPC ............. F16H 59/105; F16H 2061/247; F16H 2063/00; F16H 2063/42; F16H 2063/423; F16H 2200/00; F16H 61/00; F16H 61/0248; F16H 61/22; F16H 61/24; F16H 2059/00; F16H 2059/02; F16H 2059/0295; F16H 2059/081; F16H 59/00; F16H 59/02; F16H 59/0204; F16H 59/026; F16H 59/0221; F16H 59/08
USPC ....................................... 200/61.88
See application file for complete search history.

(56) References Cited

U.S. PATENT DOCUMENTS

| | | | | |
|---|---|---|---|---|
| 7,525,056 | B2 * | 4/2009 | Chiba .................... | H01H 13/83 |
| | | | | 200/314 |
| 10,914,372 | B2 * | 2/2021 | Yamamoto ............. | F16H 59/08 |
| 2005/0039562 | A1 | 2/2005 | Kako et al. | |
| 2018/0259063 | A1 * | 9/2018 | Wang ..................... | F16H 59/12 |

FOREIGN PATENT DOCUMENTS

| | | |
|---|---|---|
| CN | 211617432 U | 10/2020 |
| JP | 2005-096743 A | 4/2005 |
| JP | 6886912 B2 | 6/2021 |
| KR | 2020-0109668 A | 9/2020 |

* cited by examiner

*Primary Examiner* — Anthony R Jimenez
(74) *Attorney, Agent, or Firm* — Studebaker Brackett PLLC

(57) ABSTRACT

In a shift device, a magnetic sensor detects a rotational movement position of a lever. A lower light guide of the lever guides light from LEDs. The LEDs and the magnetic sensor are provided at a circuit board. Accordingly, a number of components may be reduced.

15 Claims, 12 Drawing Sheets

1

SHIFT DEVICE

CROSS-REFERENCE TO RELATED APPLICATION

This application claims priority under 35 USC 119 from Japanese Patent Application No. 2022-120885 filed Jul. 28, 2022, the disclosure of which is incorporated by reference herein in its entirety.

BACKGROUND

Technical Field

The present disclosure relates to a shift device in which a shift body is moved and a shift position is changed.

Related Art

In a shift device recited in Chinese Utility Model Application No. 211617432, a paddle is moved to change a shift position of the paddle. A light guide rod is provided at the paddle and an LED light emits light to the light guide rod. A sensor detects movement positions of the paddle.

In this shift device, the LED light is provided at a circuit board and the sensor is provided separately from the circuit board.

SUMMARY

In consideration of the circumstances described above, the present disclosure is to provide a shift device in which a number of components may be reduced.

A shift device according to a first aspect of the present disclosure includes: a shift body that is moved to change a shift position; a guide member that is provided at the shift body and that guides light; and a mounting body at which an emission section and a detection portion are provided, the emission section emitting light to the guide member and the detection portion detecting a movement position of the shift body.

In a shift device according to a second aspect of the present disclosure, in the shift device of the first aspect of the present disclosure, the emission section includes a plurality of emission portions that emit light, and an incidence face is provided at the guide member, the light emitted by the emission portions being incident on the incidence face, and a number of the emission portions that oppose the incidence face is maintained at a same number when the shift body is moved.

In a shift device according to a third aspect of the present disclosure, in the shift device of the first aspect or second aspect of the present disclosure, the detection portion detects the movement position of the shift body, sideward of the guide member.

In a shift device according to a fourth aspect of the present disclosure, in the shift device of any one of the first to third aspects of the present disclosure, an urging mechanism is provided sideward of the guide member, the urging mechanism urging the shift body toward a shift position side thereof.

In a shift device according to a fifth aspect of the present disclosure, in the shift device of any one of the first to fourth aspects of the present disclosure, a side face of a bent portion of the guide member is curved.

In a shift device according to a sixth aspect of the present disclosure, in the shift device of any one of the first to fifth aspects of the present disclosure, a protrusion portion is provided protruding from the guide member, a decreasing cavity that decreases a contact area with the guide member being provided at the protrusion portion.

In the shift device according to the first aspect of the present disclosure, the shift body is moved to change the shift position. The guide member is provided at the shift body, the emission section emits light at the guide member, and the guide member guides the light. The detection portion detects movement positions of the shift body.

The emission section and detection portion are provided at the mounting body. Therefore, in contrast to a structure in which an emission section and a detection portion are provided separately, a number of components may be reduced.

In the shift device according to the second aspect of the present disclosure, the emission section includes a plurality of emission portions that emit light, light emitted by the emission portions being incident on the incidence face of the guide member. When the shift body is moved, a number of the emission portions opposing the incidence face is maintained at the same number. Therefore, variations in an amount of light incident on the incidence face may be suppressed, and variations in an amount of light guided by the guide member may be suppressed.

In the shift device according to the third aspect of the present disclosure, the detection portion, sideward of the guide member, detects movement positions of the shift body. Therefore, a section of the shift body that guides light may be separated from a section for detecting the movement positions.

In the shift device according to the fourth aspect of the present disclosure, the urging mechanism, sideward of the guide member, urges the shift body to a shift position side thereof. Therefore, a section of the shift body that guides light may be separated from a section for urging the shift body to a shift position side.

In the shift device according to the fifth aspect of the present disclosure, the side face of the bent portion of the guide member is curved. Therefore, leakages of the light guided by the guide member at the bent portion of the guide member may be suppressed.

In the shift device according to the sixth aspect of the present disclosure, the protrusion portion is provided protruding from the guide member, and the decreasing cavity of the protrusion portion decreases a contact area of the protrusion portion with the guide member. Therefore, intrusions of the light guided by the guide member into the protrusion portion may be suppressed.

DETAILED DESCRIPTION

Figure 1:
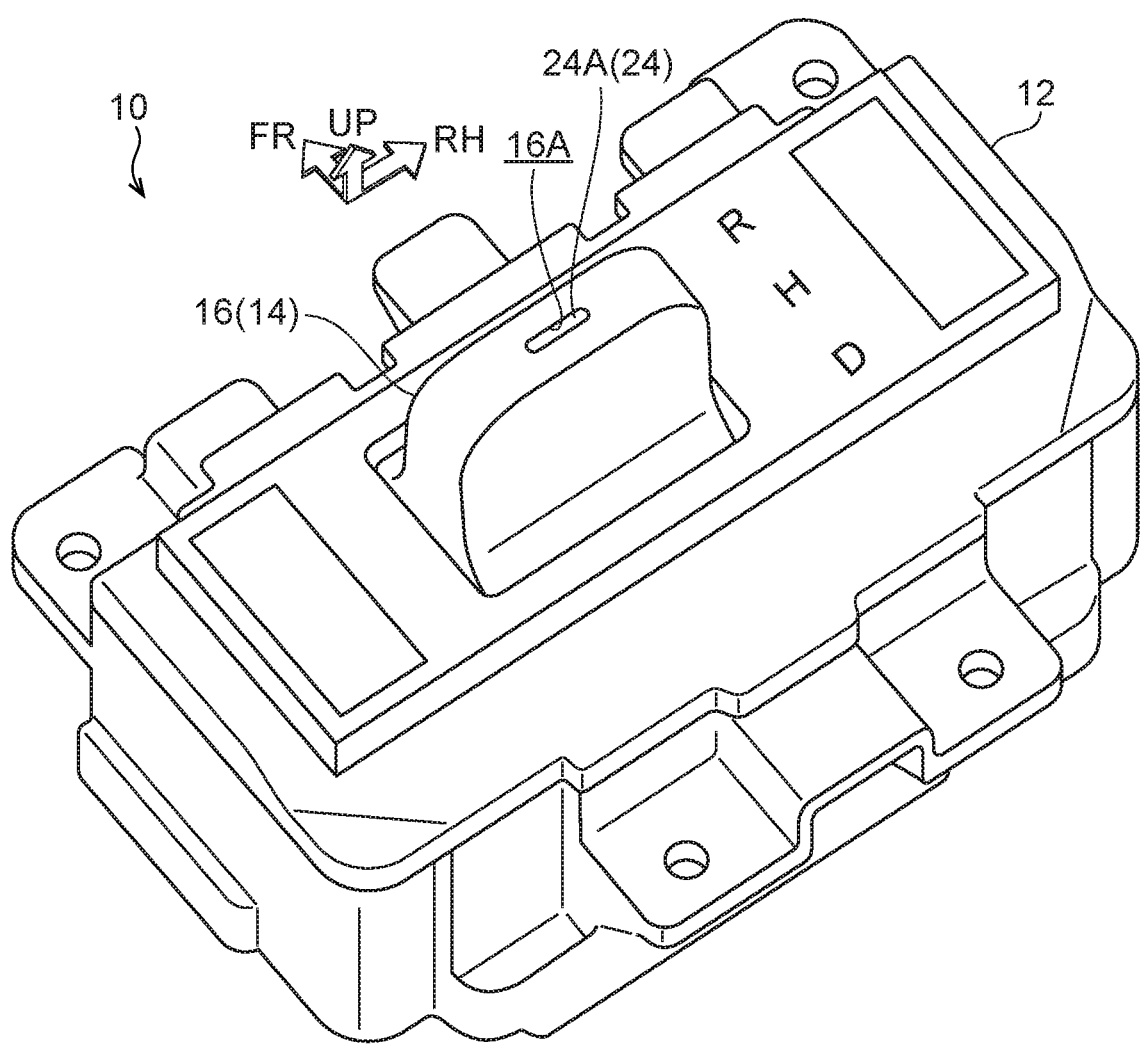
FIG. 1 is a perspective view, seen diagonally from rear left, showing a shift device according to an exemplary embodiment of the present disclosure.

FIG. 1 is a perspective view, seen diagonally from rear left, showing a shift device 10 according to an exemplary embodiment of the present disclosure. In the drawings, forward of the shift device 10 is indicated by arrow FR, rightward of the shift device 10 is indicated by arrow RH, and upward of the shift device 10 is indicated by arrow UP.

The shift device 10 according to the present exemplary embodiment is installed (mounted) at a console (not shown in the drawings) of a vehicle (a car). The front, right and upper sides of the shift device 10 are oriented to, respectively, the front, right and upper sides of the vehicle.

As shown in FIG. 1, a substantially cuboid box-shaped plate 12 that serves as a support body is provided at the shift device 10. The plate 12 is fixed inside the console (not shown in the drawings), with an upper wall of the plate 12 being exposed through the console to a cabin interior.

A lever 14 that serves as a shift body (see FIG. 7A) is provided at a middle portion in a left and right direction in the plate 12. The lever 14 is longitudinal shape in the upper and lower direction and in the left and right direction.

An upper side section of the lever 14 is formed as a knob 16 that serves as a grip portion. An upper side section of the knob 16 is formed in a substantially cuboid box shape. The interior of the upper side section of the knob 16 is open to the lower side thereof. An exposure hole 16A in a rectangular shape is formed penetrating through an upper wall of the knob 16, at a central region in the front and rear direction and in the left and right direction. The exposure hole 16A opens the interior of the upper side section of the knob 16 to the upper side thereof, and is formed to be long in the left and right direction. A lower side section of the knob 16 is formed in a substantially hemicylindrical box shape. The interior of the lower side section of the knob 16 is in communication with the interior of the upper side section of the knob 16 and is also open to the lower side.

Figure 2:
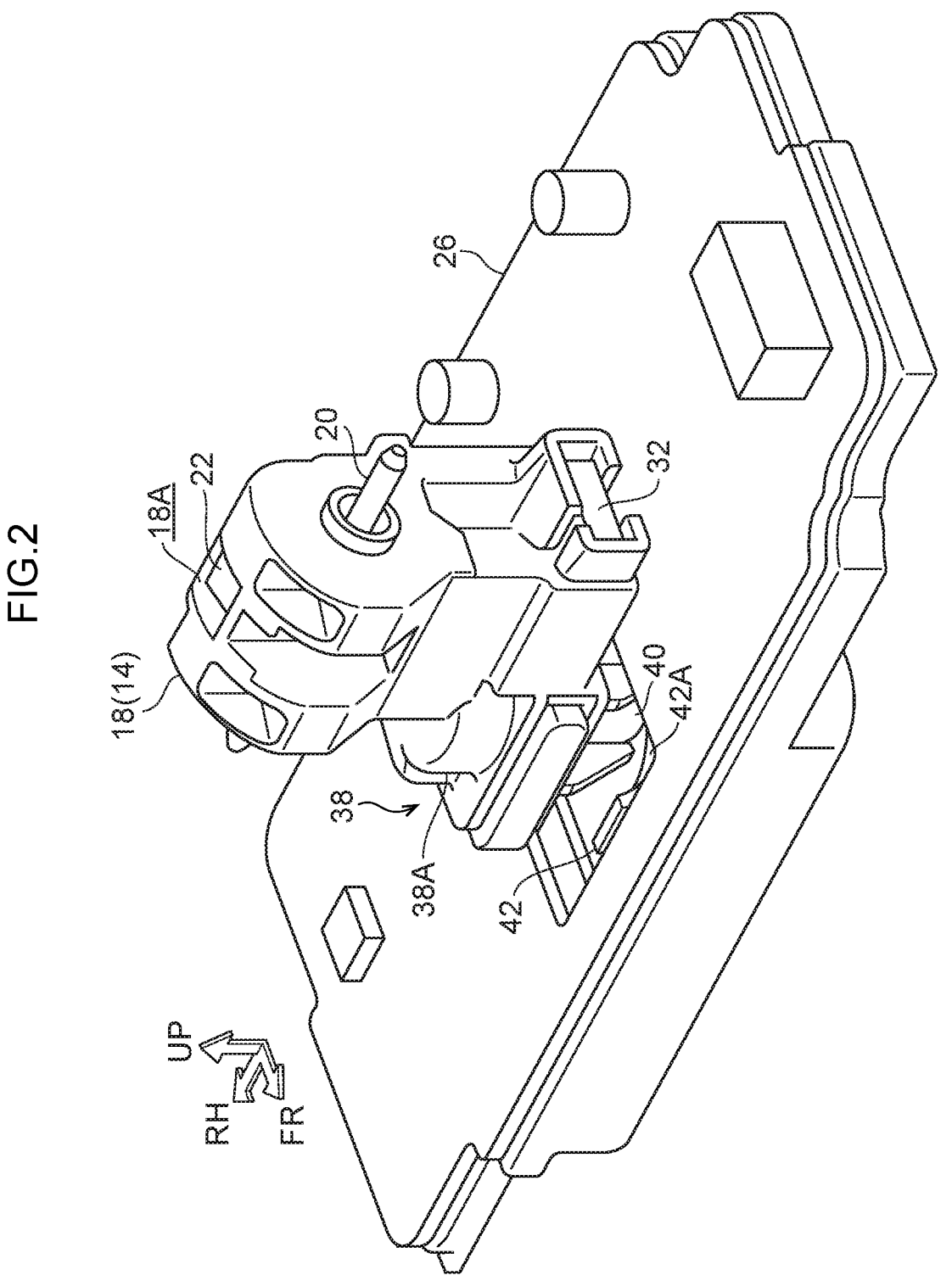
FIG. 2 is a perspective view, seen diagonally from the front left, showing principal portions of the shift device according to the exemplary embodiment of the present disclosure.

A lower side section of the lever 14 is formed as a lever main body 18 that serves as a main body portion (see FIG. 2). An upper side section of the lever main body 18 is formed in a substantially cylindrical shape, and a lower side section of the lever main body 18 is formed in a substantially cuboid shape. The upper side section of the lever main body 18 tightly fits in the lower side section of the knob 16. A support shaft 20 having a circular rod shape penetrates through, at central axis section, the upper side section of the lever main body 18 and the lower side section of the knob 16. The support shaft 20 is supported in the plate 12. The lever main body 18 is made integral with the knob 16 by the support shaft 20. Thus, the lever 14 (the knob 16 and the lever main body 18) is rotationally movable about the support shaft 20 as rotation center through a predetermined range in the front and rear direction.

The knob 16 penetrates through the upper wall of the plate 12 to be rotationally movable. The lever 14 is operable by rotational movement of the knob 16 by an occupant of the vehicle (specifically, a driver). The lever 14 is disposed at an H position (a Home position) that serves as a shift position. The lever 14 is operated by rotational movement to the front side from the H position to be disposed at an R position (a Reverse position) that also serves as a shift position (see FIG. 7B), and the lever 14 is operated by rotational movement to the rear side from the H position to be disposed at a D position (a Drive position) that also serves as a shift position (see FIG. 7C). A rotational movement angle of the lever 14 between the H position and the R position is set to be the same as a rotational movement angle of the lever 14 between the H position and the D position.

Figure 4:
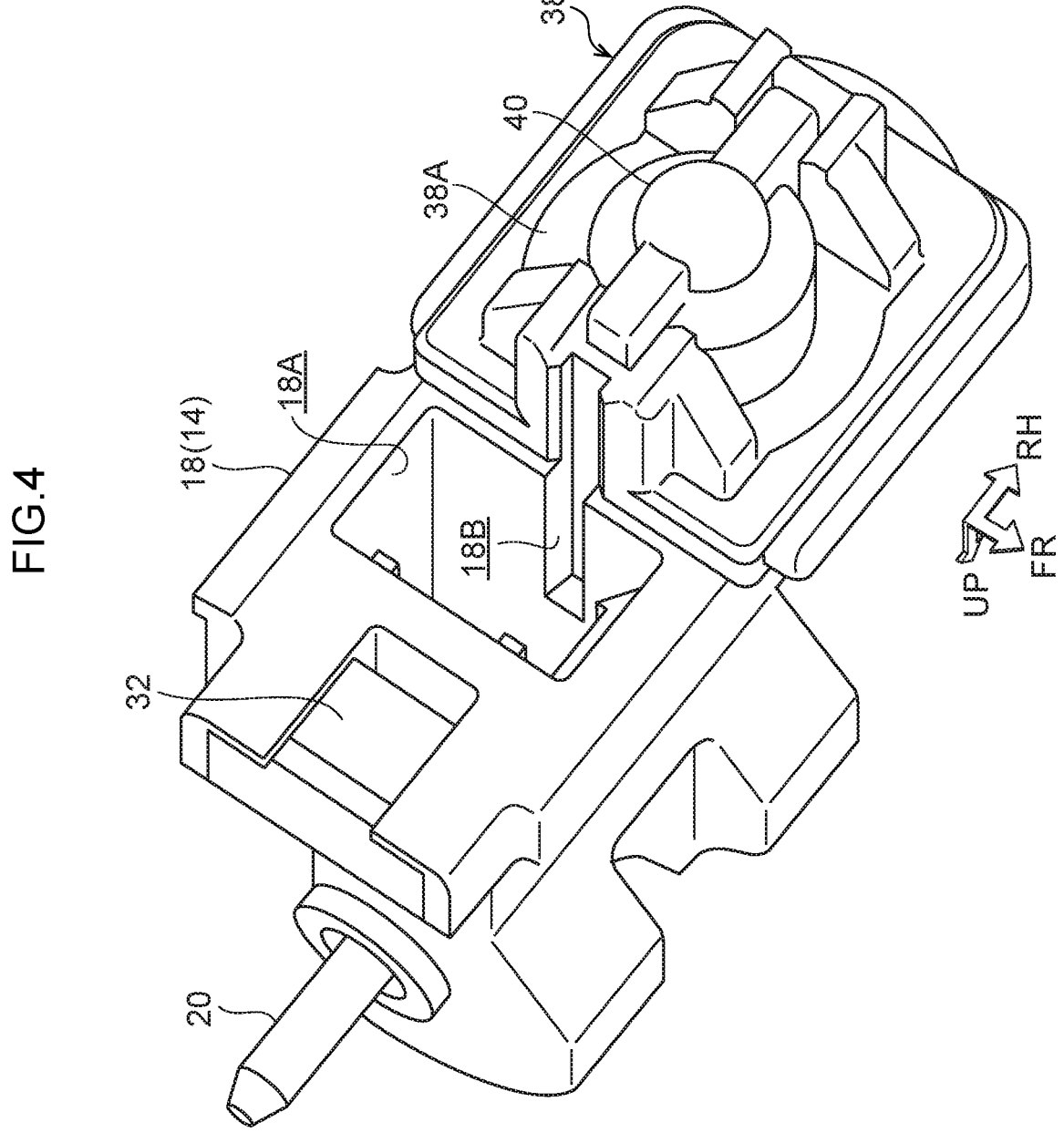
FIG. 4 is a perspective view, seen from the lower side, showing a lever main body of the shift device according to the exemplary embodiment of the present disclosure.
Figure 7A:
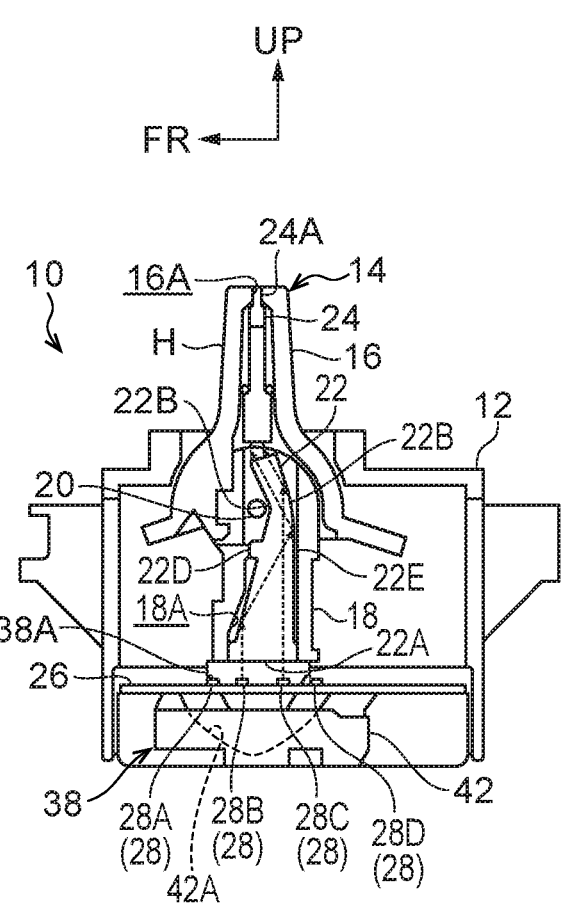
FIG. 7A is a sectional diagram in which the shift device according to the exemplary embodiment of the present disclosure is seen from the left, showing a state in which the lever is disposed at an H position.

An insertion hole 18A in a substantially cuboid rod shape is formed in the lever main body 18 (see FIG. 2, FIG. 4 and FIG. 7A). The insertion hole 18A penetrates through the lever main body 18 in the upper and lower direction. The support shaft 20 is disposed in a front portion of an upper portion vicinity of the insertion hole 18A. Press-fitting slots 18B with rectangular shapes in cross section are formed in lower portions of a left face and a right face of the insertion hole 18A. The press-fitting slots 18B extend in the upper and lower direction and are open to the lower side.

A lower light guide 22 in a substantially rectangular rod shape that serves as a guide member (a first guide member) is provided inside the insertion hole 18A (see FIG. 6A to FIG. 6C and FIG. 7A). The lower light guide 22 is transparent and is capable of guiding light thereinside. A lower end portion of the lower light guide 22 is formed in a rectangular rod shape that is made larger in the front and rear direction and in the left and right direction than a section of the lower light guide 22 at the upper side portion. The lower end portion of the lower light guide 22 is press-fitted into a lower end portion of the insertion hole 18A. A lower face of the lower light guide 22 is formed to be an incidence face 22A with a rectangular shape. The incidence face 22A is disposed orthogonally to the upper and lower direction.

A front face of a middle portion (an upper and lower direction middle portion) of the lower light guide 22 is inclined in a direction oriented to the rear on progress toward the upper side. The front face of an upper portion of the lower light guide 22 is inclined in a direction oriented to the front on progress toward the upper side. Thus, interference of the lower light guide 22 with the support shaft 20 in the insertion hole 18A is limited (prevented). A rear face of the upper portion of the lower light guide 22 is inclined in a direction oriented to the front on progress toward the upper side. Thus, the upper portion of the lower light guide 22 is bent in a direction oriented to the front on progress toward the upper side from the middle portion of the lower light guide 22. The front face and rear face between the upper portion and middle portion of the lower light guide 22 are formed as curved faces 22B. An inclination angle relative to the upward direction of the front face of the upper portion of the lower light guide 22 is greater than an inclination angle relative to the upward direction of the rear face of the upper portion of the lower light guide 22. Thus, a width dimension of the upper portion of the lower light guide 22 (a dimension substantially in the front and rear direction) increases on progress toward the upper side. An upper face of the lower light guide 22 is oriented in a direction to forward and the upper side. The upper face of the lower light guide 22 is exposed at the upper side of the insertion hole 18A.

Press-fitting upper plates 22C in rectangular plate shapes are integrally provided at the left face and right face of an upper end portion of the middle portion of the lower light guide 22. The press-fitting upper plates 22C protrude outwards in the left and right directions from the lower light guide 22. The pair of press-fitting upper plates 22C oppose one another in the left and right direction, sandwiching the lower light guide 22. A section of the lower light guide 22 at the pair of press-fitting upper plates 22C is press-fitted in the left and right direction into the insertion hole 18A, positioning the lower light guide 22 in the left and right direction.

A substantially cuboid middle press-fitting shaft 22D and a rectangular plate-shaped middle press-fitting plate 22E are integrally provided at, respectively, the front face and rear face of an upper and lower direction middle section of the middle portion of the lower light guide 22. The middle press-fitting shaft 22D and middle press-fitting plate 22E protrude outwards from the lower light guide 22 in the front and rear directions. The middle press-fitting shaft 22D and middle press-fitting plate 22E oppose one another in the front and rear direction, sandwiching the lower light guide 22. A section of the lower light guide 22 at the middle press-fitting shaft 22D and middle press-fitting plate 22E is press-fitted in the front and rear direction into the insertion hole 18A, positioning the lower light guide 22 in the front and rear direction.

Lower press-fitting shafts 22F in substantially rectangular shaft shapes, which serve as protrusion portions, are integrally provided at the left face and right face of a lower portion of the middle portion of the lower light guide 22. The pair of lower press-fitting shafts 22F protrude outwards from the lower light guide 22 in the respective left and right directions. The pair of lower press-fitting shafts 22F oppose one another in the left and right direction, sandwiching the lower light guide 22. The lower press-fitting shafts 22F extend in the upper and lower direction. The lower press-fitting shafts 22 are press-fitted in the front and rear direction into the press-fitting slots 18B of the insertion hole 18A. Consequently, the lower light guide 22 is positioned in the front and rear direction at the regions of the pair of lower press-fitting shafts 22F. At an end portion at the lower light guide 22 side of each lower press-fitting shaft 22F, a slit 22G with a rectangular shape that serves as a decreasing portion is formed. The slit 22G penetrates through the end portion at the lower light guide 22 side of the lower press-fitting shaft 22F excluding an upper portion thereof. Each of the slit 22G decreases a contact area of the lower press-fitting rod 22F with (the left face or the right face of) the lower light guide 22. A face at the lower light guide 22 side of each slit 22G serves as a portion of the left face or the right face of the lower light guide 22. Namely, due to the structure in which the slit 22G is formed, in the lower press-fitting shaft 22F, a dimension in the upper and lower direction of a portion the lower press-fitting shaft 22F which portion is press-fitted into the press-fitting slots 18B of the insertion hole 18A (a portion of the lower press-fitting shaft 22F at the side which is apart from the lower light guide 22) is longer than a dimension in the upper and lower direction of the contact area of the lower press-fitting rod 22F.

Figure 5A:
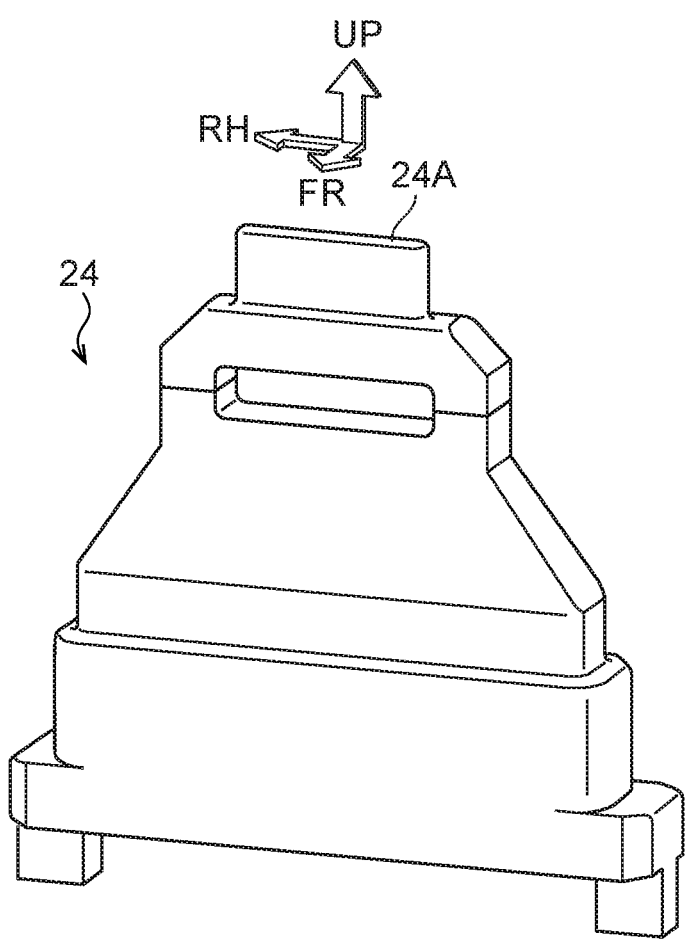
FIG. 5A is a diagram showing an upper light guide of the shift device according to the exemplary embodiment of the present disclosure, which is a perspective view seen diagonally from the front left.
Figure 5B:
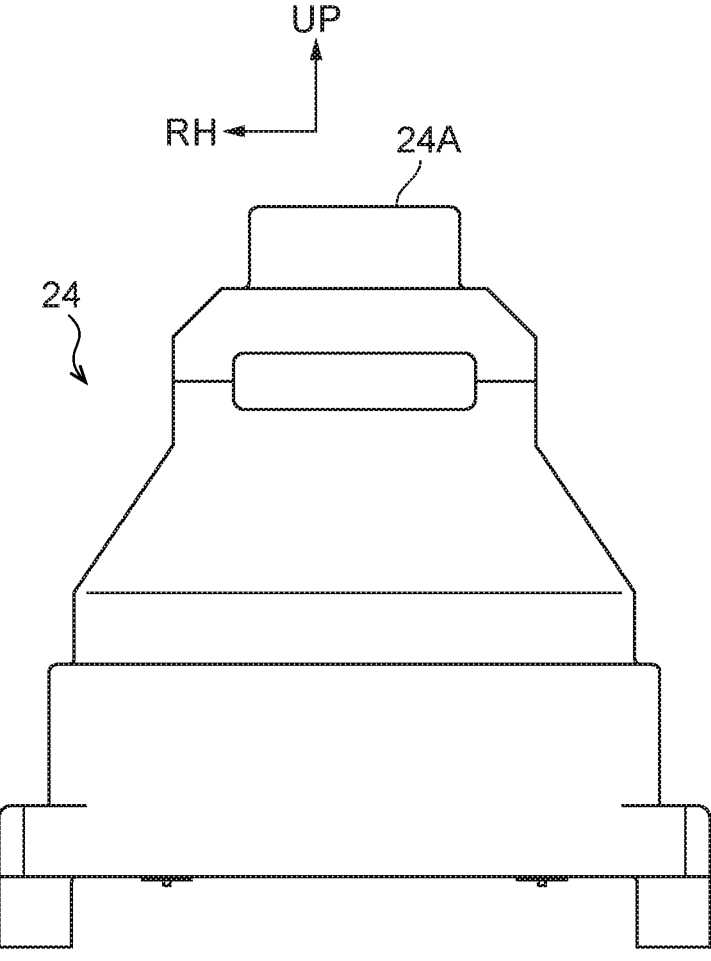
FIG. 5B is another diagram showing the upper light guide of the shift device according to the exemplary embodiment of the present disclosure, which is a front view seen from the front.
Figure 6A:
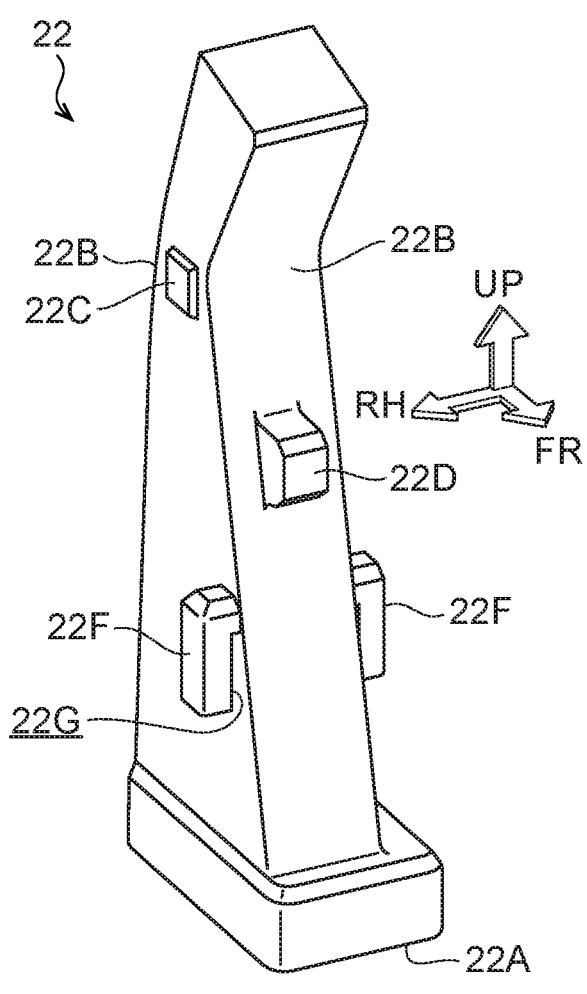
FIG. 6A is a diagram showing a lower light guide of the shift device according to the exemplary embodiment of the present disclosure, which is a perspective view seen diagonally from the front right.
Figure 6B:
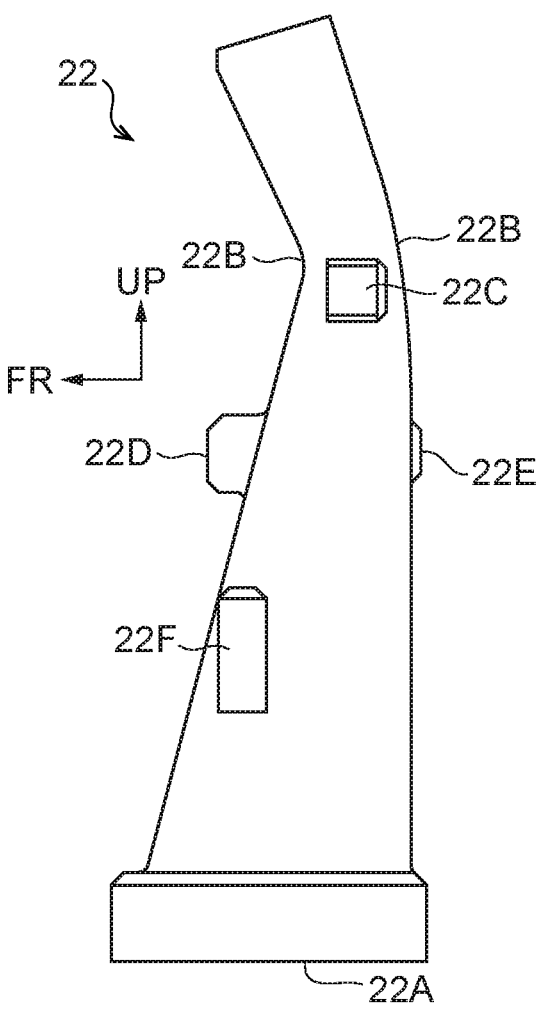
FIG. 6B is another diagram showing the lower light guide of the shift device according to the exemplary embodiment of the present disclosure, which is a side view seen from the left.
Figure 6C:
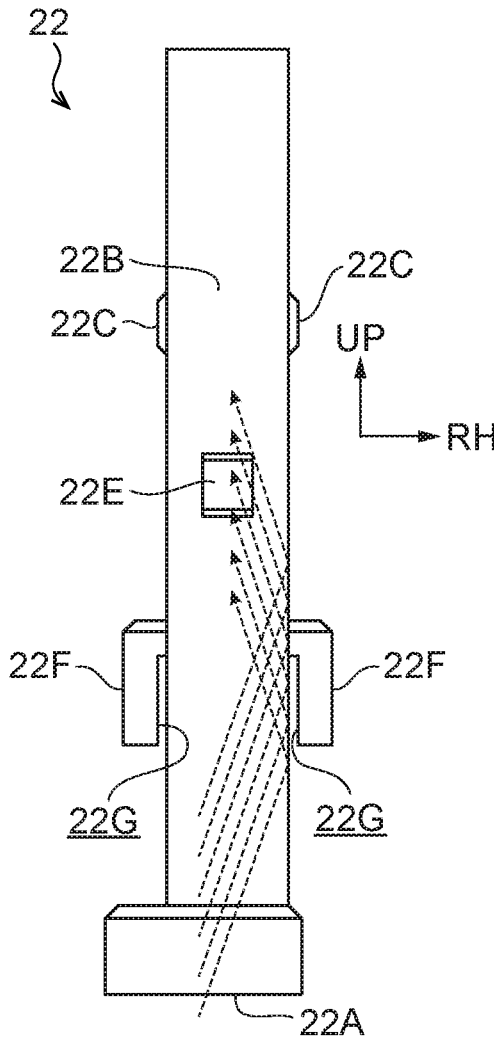
FIG. 6C is yet another diagram showing the lower light guide of the shift device according to the exemplary embodiment of the present disclosure, which is a rear view seen from the rear.

A substantially rectangular plate-shaped upper light guide 24 that serves as a second guide member (see FIG. 5A, FIG. 5B and FIG. 7A) is fixed inside the upper side section of the knob 16. The upper light guide 24 is transparent and is capable of guiding light thereinside. A lower face of the upper light guide 24 is exposed to the interior of the lower side section of the knob 16. The upper face of the lower light guide 22 opposes (is directed to) the lower face of the upper light guide 24. A substantially rectangular plate-shaped illumination plate 24A that serves as an illumination portion is integrally provided at an upper face of the upper light guide 24. The upper light guide 24 protrudes upward and is formed to be long in the left and right direction. The illumination plate 24A fits tightly in the exposure hole 16A of the knob 16. The illumination plate 24A is exposed at the upper side of the knob 16, and an upper face of the illumination plate 24A is coplanar (flush) with an upper face of the knob 16.

Figure 3:
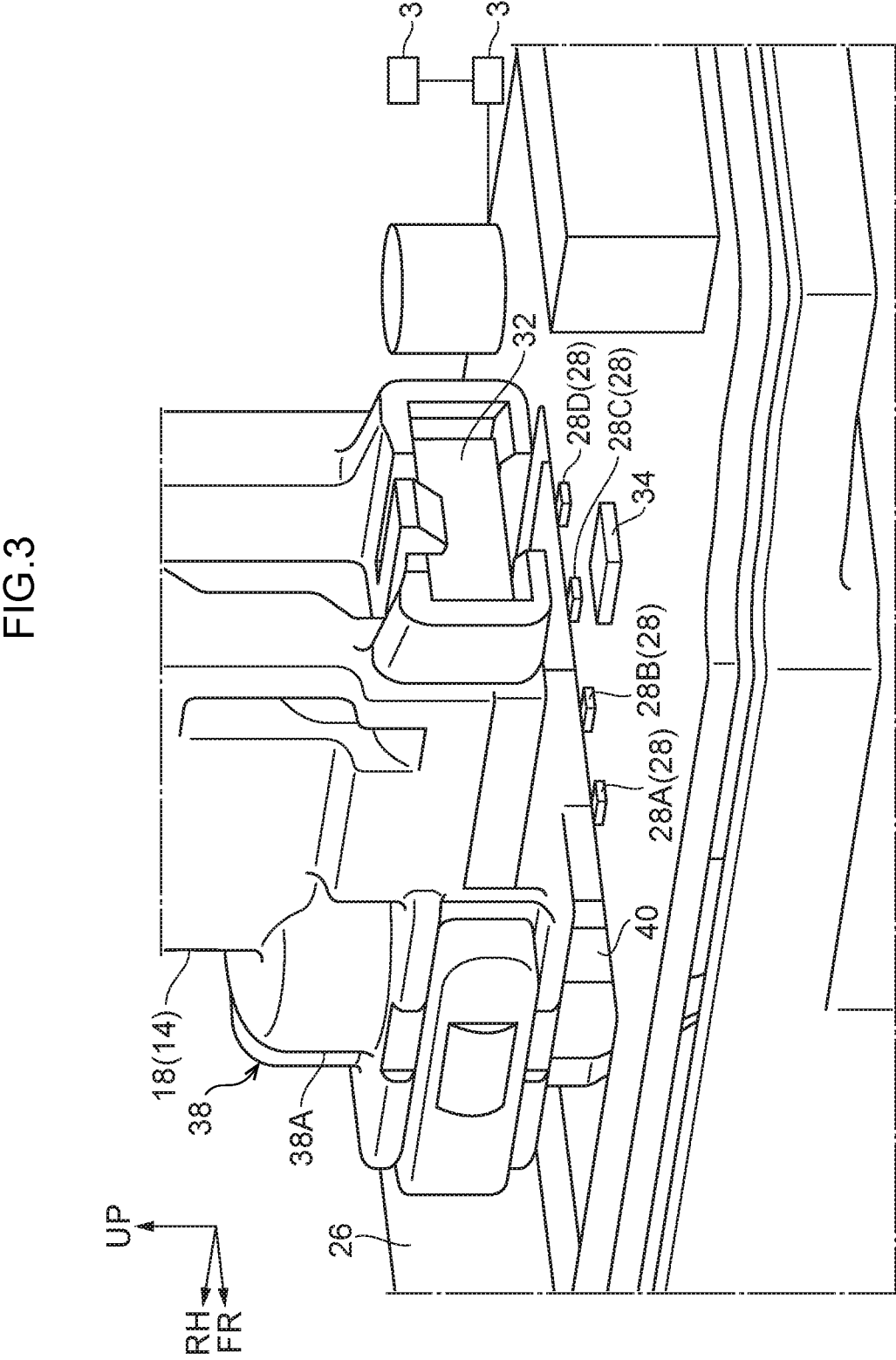
FIG. 3 is a perspective view, seen diagonally from the front left, in which principal portions of the shift device according to the exemplary embodiment of the present disclosure are shown magnified.

A circuit board 26 that serves as a mounting body (see FIG. 3 and FIG. 7A) is provided at the lower side of the lever main body 18. The circuit board 26 is disposed orthogonally to the upper and lower direction, and is fixed in a lower portion of the interior of the plate 12.

LEDs 28 that serve as emission portions are plurally provided (an emission section having the plural emission portions is provided) at an upper face of the circuit board 26, at the lower side of the lower light guide 22. The plural LEDs 28 are disposed to be spaced apart therebetween in the front and rear direction. The LEDs 28 are electrically connected to a control device 30 of the vehicle via the circuit board 26. The LEDs 28 illuminate (emit) light upward by control of the control device 30. Note that the emission section having a single emission portion may be provided at the upper face of the circuit board 26.

In the present exemplary embodiment, four of the LEDs 28 are provided (in order from the front side to the rear side, a first LED 28A, a second LED 28B, a third LED 28C and a fourth LED 28D). A spacing in the front and rear direction between the first LED 28A and the second LED 28B and a spacing in the front and rear direction between the third LED 28C and the fourth LED 28D are equal. The spacing in the front and rear direction between the first LED 28A and second LED 28B and the spacing in the front and rear direction between the third LED 28C and fourth LED 28D are smaller than a spacing in the front and rear direction between the second LED 28B and the third LED 28C. The second LED 28B and third LED 28C oppose (face) the incidence face 22A of the lower light guide 22 in the upper and lower direction (in other words, in a direction orthogonal to the upper face of the circuit board 26 on which the LEDs 28 are mounted), in an extending direction of the shift lever 14 which is at H position). When the lever 14 is rotationally moved from the H position, at the same time as a partial opposition (facing) in the upper and lower direction between the incidence face 22A and the first LED 28A or the fourth LED 28D begins, a partial termination of opposition (facing) in the upper and lower direction between the incidence face 22A and the third LED 28C or the second LED 28B begins. Thus, even when the lever 14 is rotationally moved, a number (area) of the LEDs 28 opposing (facing) the incidence face 22A in the upper and lower direction is maintained at the same number (the same area).

Figure 7B:
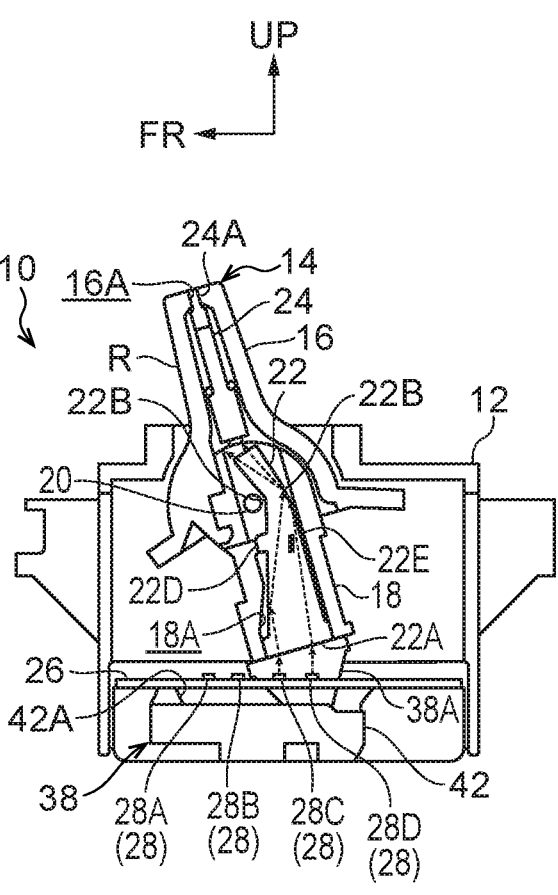
FIG. 7B is another sectional diagram in which the shift device according to the exemplary embodiment of the present disclosure is seen from the left, showing a state in which the lever is disposed at an R position.
Figure 7C:
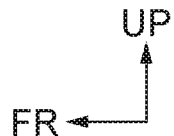
FIG. 7C is yet another sectional diagram in which the shift device according to the exemplary embodiment of the present disclosure is seen from the left, showing a state in which the lever is disposed at a D position.
Figure 7C:
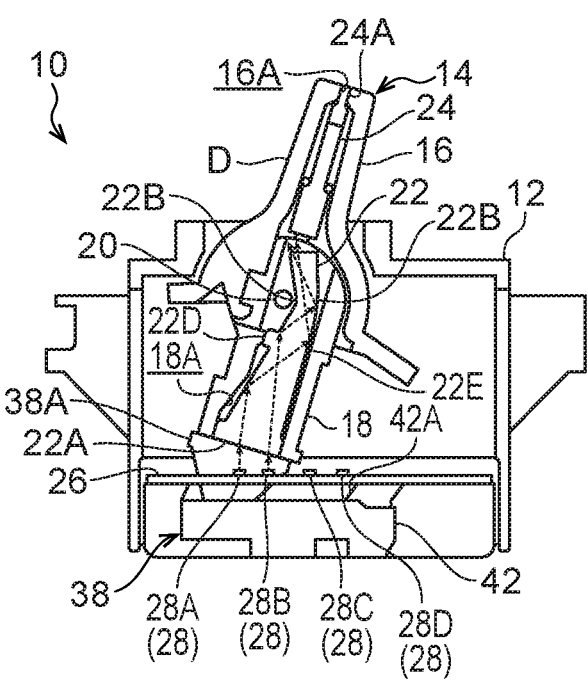

For example, as shown in FIGS. 7A-7C, in a case in which the lever 14 is disposed at the R position (a shift position at one side in the rotational direction), in a case in which the lever 14 is disposed at the D position (a shift position at the other side in the rotational direction) and in a case in which the lever 14 is disposed at the H position (a shift position at middle position between the one side and the other side in the rotational direction), a number (area) of the LEDs 28 opposing (facing) the incidence face 22A in the upper and lower direction is maintained at the same number (for example, "2") (the same area).

A magnet 32 in a cuboid shape that serves as a detected portion (see FIG. 3 and FIG. 4) is provided at a lower end portion of the lever main body 18, at the left side of the lower light guide 22. The magnet 32 is fixed in the lever main body 18 and rotationally moves integrally with the lever 14. A magnetic sensor 34 that serves as a detecting portion is provided below the magnet 32, at the upper face of the circuit board 26. The magnetic sensor 34 detects directions of the magnetic field generated by the magnet 32, and thus detects rotational movement positions of the magnet 32. The magnetic sensor 34 is electrically connected to the control device 30 via the circuit board 26. A transmission 36 of the vehicle (an automatic transmission) is electrically connected to the control device 30.

A detent mechanism 38 that serves as an urging mechanism (see FIG. 2 and FIG. 4) is provided to the right side of the lever 14.

An urging tube 38A substantially in the shape of a circular tube with a bottom is integrally provided at the lower end portion of the lever main body 18, to the right side of the lower light guide 22. An axial direction of the urging tube 38A is in the upper and lower direction, and the interior of the urging tube 38A is open to the lower side. The urging tube 38A projects to the lower side from the lever main body 18. The urging tube 38A penetrates through the circuit board 26 to be capable of rotational movement. An urging pin 40 in a substantially circular shaft shape that serves as an urging portion is tightly fitted coaxially inside the urging tube 38A. A distal end face (a lower face) of the urging pin 40 is curved in a projecting (convex) shape. A coil spring that serves as an urging member (not shown in the drawings) is coaxially disposed between a proximal (base) end face (an upper face) of the urging pin 40 and a bottom wall (upper wall) of the urging tube 38A. The coil spring is compressed and urges the urging pin 40 toward the lower side. A block-shaped urging body 42 is provided at the lower side of the urging pin 40. The urging body 42 is fixed at a lower end portion of the interior of the plate 12 (at the lower side relative to the circuit board 26). An urging face 42A with a substantial "V" shape in cross section that serves as an urged portion (see FIG. 7A) is formed at the urging body 42. The urging face 42A is inclined from a central portion (a front and rear direction central portion) thereof in directions oriented to the upper side toward each of two end portions (both of front and rear direction end portions) thereof.

The distal end face of the urging pin 40 is abutted against the urging face 42A by the urging force of the coil spring and is urged to a side of the central portion of the urging face 42A. As a result, the lever 14 is urged to an H position side thereof and is retained at the H position. When the lever 14 is being rotationally moved from the H position, the distal end face of the urging pin 40 is moved from the central portion toward an end portion side of the urging face 42A against (resisting) the urging force of the coil spring, and a rotational movement resistance force acts on the lever 14. When the lever 14 has been rotationally moved from the H position and operation of a rotational movement force on the lever 14 is released, the distal end face of the urging pin 40 is moved from the end portion side toward the central portion of the urging face 42A by the urging force of the coil spring, and the lever 14 is rotationally moved (returned) to the H position.

Next, operation of the present exemplary embodiment is described.

In the shift device 10 with the structure described above, the lever 14 is operated to rotationally move to the front side or rear side from the H position, and the lever 14 is disposed at the respective R position or D position. The magnetic sensor 34 detects a rotational movement position of the magnet 32 at the lever 14, detecting a rotational movement position of the lever 14 and hence the shift position. Consequently, when the lever 14 is disposed at the R position or the D position, a shift range of the transmission 36 is changed (altered) by control from the control device 30 to, respectively, an R range (a reverse range) or a D range (a drive range). At the detent mechanism 38, the distal end face of the urging pin 40 is abutted against the urging face 42A of the urging body 42 by the urging force of the coil spring and urges the lever 14 to the H position side thereof.

The lower light guide 22 and upper light guide 24 are provided at the lever 14. The LEDs 28 emit lights upward, and light(s) is(are) incident on the incidence face 22A of the lower light guide 22. Hence, the lower light guide 22 reflects the light at side face(s) thereof, guiding the light to the upper side, and emits the light from the upper face thereof. The light from the upper face of the lower light guide 22 is incident on the lower face of the upper light guide 24. Hence, the upper light guide 24 reflects the light at side face(s) thereof, guiding the light to the upper side, and illuminates the light from the upper face of the illumination plate 24A to the upper side of the lever 14 (the upper side of the knob 16). Thus, the upper face of the lever 14 (the upper face of the knob 16) is lit up.

In this exemplary embodiment, the LEDs 28 and the magnetic sensor 34 are provided at the same circuit board 26. Therefore, a number of components may be reduced compared to a structure in which the LEDs 28 and the magnetic sensor 34 are provided at separate circuit boards. In addition, there is no need to provide the LEDs 28 at the lever 14 in order to illuminate the upper face of the lever 14, any need to wire a harness to the lever 14 may be reduced, and ease of assembly may be improved.

When the lever 14 is being rotationally moved, a number of the LEDs 28 opposing the incidence face 22A of the lower light guide 22 in the upper and lower direction is maintained at the same number. Therefore, variations in an amount of light incident on the incidence face 22A may be suppressed, variations in an amount of light guided by the lower light guide 22 and the upper light guide 24 may be suppressed, and variations in an amount of light illuminated to the upper side of the lever 14 may be suppressed.

A bent portion in the front and rear direction is formed between the middle portion and upper portion of the lower light guide 22, and the front face and rear face of the section between the middle portion and upper portion of the lower light guide 22 are formed as the curved faces 22B. Therefore, incidence angle on the curved face 22B of the light guided by the lower light guide 22 may be increased, leakages of the light guided by the lower light guide 22 at the inflection portion of the lower light guide 22 may be suppressed, and a reduction in the amount of light illuminated at the upper side of the lever 14 may be suppressed.

The slit 22G of each lower press-fitting shaft 22F of the lower light guide 22 decreases a contact area of the lower press-fitting shaft 22F with the lower light guide 22. Therefore, the light guided by the lower light guide 22 intruding into and leaking from the lower press-fitting shafts 22F may be suppressed, and a reduction in the amount of light illuminated at the upper side of the lever 14 may be suppressed.

The magnet 32 and magnetic sensor 34 are disposed to the left side of the lower light guide 22. At the left side of the lower light guide 22, the magnetic sensor 34 detects rotational movement positions of the magnet 32, detecting rotational movement positions of the lever 14. Therefore, a section of the lever 14 that guides light can be separated from a section for detection of the rotational movement positions. Thus, the section of the lever 14 that guides light and the section for detection of the rotational movement positions may be suitably disposed.

The detent mechanism 38 is disposed to the right side of the lower light guide 22. At the right side of the lower light guide 22, the detent mechanism 38 urges the lever 14 to the H position side thereof. Therefore, the section of the lever 14 that guides light can be separated from a section for urging the lever 14 to an H position side. Thus, the section of the lever 14 that guides light and the section for urging the lever 14 to the H position side may be suitably disposed.

In the present exemplary embodiment, the lower press-fitting shafts 22F (protrusion portion) of the lower light guide 22 are press-fitted into the lever 14 and positioned. However, protrusion portions of the lower light guide 22 may be caught (anchored) at and assembled to the lever 14 by, for example, being formed as catching (anchoring) pawls.

In the present exemplary embodiment, the lever 14 is rotationally moved. However, the lever 14 may be slid (moved).

In the present exemplary embodiment, the shift device 10 is mounted at a console of a vehicle. However, the shift device 10 may be mounted at an alternative portion of a vehicle (an instrument panel, a steering column or the like). In such cases, the upper side (the upper and lower direction) of the shift device 10 described above may be oriented to a diagonally upper side (diagonally upper and lower direction) of the vehicle.

What is claimed is:

1. A shift device for a vehicle, comprising:
   a shift body including a rotatable portion that is operable by rotational movement to change a shift position among plural shift positions of the vehicle;
   a guide member that is provided at the shift body and that guides light; and
   a mounting body at which an emission section and a detection portion are provided, the emission section emitting light to the guide member and the detection portion detecting a movement position of the shift body,
   wherein the guide member is provided in an insertion hole formed in the rotatable portion of the shift body, and
   the guide member and the rotatable portion of the shift body are rotationally moveable in a front and rear direction of the vehicle due to the shift body being rotationally operated.

2. The shift device of claim 1, wherein the emission section includes a plurality of emission portions that emit light, and an incidence face is provided at the guide member, the light emitted by the emission portions being incident on the incidence face, and a number of the emission portions that oppose the incidence face is maintained at a same number when the shift body is moved.

3. The shift device of claim 1, wherein the detection portion detects the movement position of the shift body, sideward of the guide member.

4. The shift device of claim 1, wherein an urging mechanism is provided sideward of the guide member, the urging mechanism urging the shift body toward a shift position side thereof.

5. The shift device of claim 1, wherein a side face of a bent portion of the guide member is curved.

6. The shift device of claim 1, wherein the mounting body is a circuit board, the emission section being electrically connected to a control device of the vehicle via the circuit board and the detection portion being electrically connected to the control device via the circuit board.

7. The shift device of claim 1, wherein an incident face is provided at the guide member, the light emitted by the emission section being incident on the incidence face, and the incidence face of the guide member is movable in the front and rear direction due to the shift body being rotationally operated.

8. The shift device of claim 1, wherein a protrusion portion is provided protruding from the guide member, a decreasing section that decreases a contact area with the guide member being provided at the protrusion portion.

9. The shift device of claim 8, wherein the decreasing section is a slit portion formed between the guide member and the protrusion portion.

10. The shift device of claim 1, wherein the plural shift positions include a drive position corresponding to a drive range of a transmission of the vehicle and a reverse position corresponding to a reverse range of the transmission.

11. The shift device of claim 10, wherein the mounting body is a circuit board, the emission section being electrically connected to a control device of the vehicle via the circuit board and the detection portion being electrically connected to the control device of the vehicle via the circuit board, and the control device is electrically connected to the transmission.

12. The shift device of claim 1, wherein the guide member is rotationally movable together with the rotational portion of shift body in the front and rear direction due to the shift body being rotationally operated.

13. The shift device of claim 12, wherein an incident face is provided at the guide member, the light emitted by the emission section being incident on the incidence face, and the incidence face of the guide member is movable in the front and rear direction due to the shift body being rotationally operated.

14. The shift device of claim 13, wherein the emission section includes a plurality of emission portions that emit light, and an incidence face is provided at the guide member, the light emitted by the emission portions being incident on the incidence face, and a number of the emission portions that oppose the incidence face is maintained at a same number when the shift body is moved.

15. A shift device for a vehicle, comprising:
   a shift body that is operable by rotational movement to change a shift position among plural shift positions of the vehicle;

a guide member that is provided at a rotatable portion of the shift body and that guides light; and a mounting body at which an emission section and a detection portion are provided, the emission section emitting light to the guide member and the detection portion detecting a movement position of the shift body, wherein the guide member is provided in an insertion hole formed in the rotatable portion of the shift body, and the rotatable portion of the shift body is rotationally movable about an axis which extends along a right and left direction of the vehicle, and the guide member and the rotatable portion of the shift body are rotationally movable about the axis in a front and rear direction of the vehicle due to the shift body being rotationally operated.

* * * * *